US010015809B2

(12) United States Patent
Zhang et al.

(10) Patent No.: US 10,015,809 B2
(45) Date of Patent: Jul. 3, 2018

(54) SYNCHRONIZATION SCHEDULE METHOD, APPARATUS AND SYSTEM

(75) Inventors: Dajun Zhang, Beijing (CN); Xiaodong Yang, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 750 days.

(21) Appl. No.: 13/322,440

(22) PCT Filed: Jun. 17, 2010

(86) PCT No.: PCT/CN2010/074016
§ 371 (c)(1),
(2), (4) Date: Nov. 23, 2011

(87) PCT Pub. No.: WO2011/000265
PCT Pub. Date: Jan. 6, 2011

(65) Prior Publication Data
US 2012/0069785 A1    Mar. 22, 2012

(30) Foreign Application Priority Data
Jun. 29, 2009   (CN) .......................... 2009 1 0087933

(51) Int. Cl.
H04W 72/12    (2009.01)
H04W 4/12     (2009.01)
H04W 56/00    (2009.01)

(52) U.S. Cl.
CPC ............ *H04W 72/121* (2013.01); *H04W 4/12* (2013.01); *H04W 56/00* (2013.01)

(58) Field of Classification Search
CPC .................................................. H04W 72/121
See application file for complete search history.

(56) References Cited

U.S. PATENT DOCUMENTS 8,175,069 B2 *  5/2012  Wang .................. H04W 72/005
                                                            370/342
8,199,741 B2 *  6/2012  Al ........................ H04W 56/00
                                                            370/342
(Continued)

FOREIGN PATENT DOCUMENTS

CN          1953602 A       4/2007
CN         101262277         9/2008
(Continued)

OTHER PUBLICATIONS

ISR for related PCT/CN2010/074016 dated Sep. 23, 2010 (and its English translation).
(Continued)

Primary Examiner — Gregory B Sefcheck
(74) Attorney, Agent, or Firm — Ladas & Parry, LLP

(57) ABSTRACT

A synchronization schedule method, apparatus and system are provided. The method includes that base station equipment obtains a scheduling sequence of the multimedia broadcast multicast service (MBMS); the base station equipment makes the received synchronization data frame of MBMS perform ordering, and sends the synchronization data frame according to the ordering result. The method, apparatus and system make the received synchronization data frame of MBMS perform ordering according to the scheduling sequence, so as to ensure a plurality of MBMS perform synchronization schedule and synchronization multiplex between the base station equipments, and make the system obtain the statistical multiplex gain of MBMS service.

9 Claims, 7 Drawing Sheets

(56) References Cited

U.S. PATENT DOCUMENTS

| | | | | |
|---|---|---|---|---|
| 8,306,544 | B2* | 11/2012 | Ishii | H04W 72/0406 |
| | | | | 370/329 |
| 8,472,377 | B2* | 6/2013 | Becker | H04W 72/005 |
| | | | | 370/312 |
| 8,649,312 | B2* | 2/2014 | Kim | H04W 4/06 |
| | | | | 370/252 |
| 8,767,606 | B2* | 7/2014 | Yi | H04W 72/005 |
| | | | | 370/229 |
| 8,811,252 | B2* | 8/2014 | Maeda | H04L 5/0007 |
| | | | | 370/312 |
| 8,855,037 | B2* | 10/2014 | Zhai | H04L 5/003 |
| | | | | 370/312 |
| 8,983,512 | B2* | 3/2015 | Wang | H04L 12/1881 |
| | | | | 455/3.02 |
| 9,094,182 | B2* | 7/2015 | Piggin | H04L 5/0096 |
| 9,173,226 | B2* | 10/2015 | Van Lieshout | H04W 72/121 |
| 9,264,160 | B2* | 2/2016 | Yi | H04W 72/005 |
| 9,306,993 | B2* | 4/2016 | Maeda | H04L 5/0007 |
| 9,338,802 | B2* | 5/2016 | LeCompte | H04W 28/06 |
| 9,398,605 | B2* | 7/2016 | Huang | H04W 4/06 |
| 9,414,358 | B2* | 8/2016 | Piggin | H04W 72/005 |
| 9,456,435 | B2* | 9/2016 | Piggin | H04W 72/005 |
| 9,497,014 | B2* | 11/2016 | Yi | H04W 72/005 |
| 2004/0057387 | A1* | 3/2004 | Yi et al. | 370/252 |
| 2004/0116125 | A1 | 6/2004 | Terry | |
| 2008/0101270 | A1* | 5/2008 | Kekki et al. | 370/312 |
| 2008/0205322 | A1* | 8/2008 | Cai et al. | 370/312 |
| 2009/0252132 | A1* | 10/2009 | Song et al. | 370/338 |
| 2011/0044225 | A1* | 2/2011 | Rinne et al. | 370/312 |
| 2011/0211515 | A1* | 9/2011 | Zeller et al. | 370/312 |

FOREIGN PATENT DOCUMENTS

| | | |
|---|---|---|
| CN | 101272518 | 9/2008 |
| CN | 101370157 | 2/2009 |
| CN | 101394338 | 3/2009 |
| JP | 2010-502101 | 1/2010 |
| JP | 2010-510714 | 4/2010 |
| KR | 10-2009-0045939 | 5/2009 |
| WO | 2008/024214 | 2/2008 |
| WO | 2008/060236 | 5/2008 |
| WO | 2008/117357 | 10/2008 |
| WO | 2008/155332 A2 | 12/2008 |

OTHER PUBLICATIONS

Nokia et al: "MBSFN Scheduling and Content Synchronization", 3GPP Draft; R3-071920 MBSFN Scheduling and Content Synchronization, 3rd Generation Partnership Project (3GPP), Mobile Competence Centre; 650, Route Des Lucioles; F-06921 Sophia-Antipolis Cedex; France, vol. RAN WG3, No. Sophia Antipolis, France; Oct. 3, 2007, Oct. 3, 2007 (Oct. 3, 2007), XP050162710 pp. 1-11.

Extended European Search Report with EPO Supplementary European Search Report and search opinion for EP10793560.3 dated Jun. 27, 2016.

Office Action from corresponding JP Appln No. 2012-516496 dated Sep. 23, 2013 and its English translation.

Decision of Rejection from corresponding CN Appln No. 200910087933.8 dated Apr. 3, 2014 and its English translation.

Office Action from corresponding CN Appln No. 2009100879338 dated Aug. 3, 2012 and its English translation.

Office Action from corresponding CN Appln No. 2009100879338 dated Apr. 1, 2013 and its English translation.

Office Action from corresponding CN Appln No. 2009100879338 dated Oct. 14, 2013 and its English translation.

Office Action from corresponding KR Appln No. 10-2011-7028676 dated Dec. 7, 2012 and its English translation.

Office Action from corresponding KR Appln No. 10-2011-7028676 dated Jul. 19, 2013 and its English translation.

ISR for corresponding PCT/CN2010/074016 dated Sep. 23, 2010 (and its English translation).

IPRP for related PCT/CN2010/074016 dated Jan. 4, 2012 (and its English translation).

WO for related PCT/CN2010/074016 dated Sep. 23, 2010 (and its English translation).

* cited by examiner

SYNCHRONIZATION SCHEDULE METHOD, APPARATUS AND SYSTEM

CROSS-REFERENCE TO RELATED APPLICATIONS

This application is the U.S. National Stage of International Patent Application No. PCT/CN2010/074016 filed on Jun. 17, 2010, which claims priority to Chinese Patent Application Number 200910087933.8 filed on Jun. 29, 2009, the disclosures of which are hereby incorporated by reference in their entireties.

The present application claims the priority of the Chinese patent application with the application date of Jun. 29, 2009, the application number of 200910087933.8, and the patent name of "synchronization schedule method, apparatus and system", all content of the priority application is combined into the present application by quoting.

FIELD OF THE PRESENT INVENTION

The present invention relates generally to the field of Mobile communication technology, and more particularly to synchronization schedule method, apparatus and system.

BACKGROUND OF THE PRESENT INVENTION

Multimedia broadcast multicast service (MBMS) is multimedia broadcast multicast function defined in 3rd generation partnership project (3GPP) R6, it is used for providing multimedia broadcast and multicast service to users in wireless cell. In long term evolution (LTE) system, MBMS dedicated frequency layer and frequency layer shared with non-MBMS service could all provide MBMS, the LTE cell supporting MBMS could be MBMS dedicated cell, also could be MBMS/unicast mixing cell.

Therein, MBMS dedicated frequency layer is the frequency layer which is dedicated for MBMS transmission, when a cell is configured as MBMS dedicated frequency layer, that cell is MBMS dedicated cell; when a cell is configured as frequency layer which is non-dedicated for MBMS transmission, that cell is MBMS/unicast mixing cell, the MBMS/unicast mixing cell transmits MBMS and unicast service in collaboration, some time is used for MBMS service transmission, other time is used for unicast service transmission. MBMS could be transmitted in single cell, or in multiple cells. The single cell transmission of MBMS means MBMS only transmitted in coverage of a specified cell, it doesn't support combination transmission of MBMS in multiple cells. However, the multiple cells transmission of MBMS needs the support of the transmission manner of multicast broadcast single frequency network (MBSFN).

MBSFN is the manner that performs synchronous transmission in multiple cells with same frequency at same time, it could thrift frequency resources, and improve utilization rate of spectrum. MBSFN requires the multiple cells send same data at same time, receiver of user equipment (UE) could consider the multiple MBSFN cells as a single big cell. There would not be interference from neighbor cells, and the signal strength would be increased by superimposing signal from multiple MBSFN cells. MBMS dedicated cell and MBMS/unicast mixing cell could all use MBSFN transmission mode. In addition, by using advanced UE receiver technique, the problem of time difference of multipath transmission could be resolved, so that the interference from neighbor cells could be eliminated; the diversity effect of multiple cells co-frequency transmission could resolve problem of blind area, improve the reliability of receiving, and MBMS coverage rate.

The characteristic of MBMS multiple cells transmission technology comprises: synchronization transmission of MBMS in MBSFN area; supporting combination of MBMS multiple cells transmission; MBMS point-to-multipoint traffic channel (MTCH) and MBMS point-to-multipoint control channel (MCCH) is mapped on multicast channel (MCH) used for point to multi-point (PTM) transmission; MBSFN synchronization area could be semi-statically configured by operation and maintenance (O&M) system etc.

The spectral efficiency of MBMS could be 2 bps/Hz or higher, if the bandwidth of carrier wave is 20 MHz, then each sub-frame could at least carry 40 k bit information. For improving utilization rate of frequency resource, it could use statistical multiplexing in multiple streams transmission system, obtaining multiplexing gain by multiplexing multiple streams on shared resource. To MBMS multiple cells transmission, multiple MBMS could, multiple MBMS could be mapped on same MCH, it could obtain dynamic multiplexing gain by allocating resource to MCH correctly and dynamically scheduling to multiple MBMS on MCH.

Content synchronization mechanism of multiple cells transmission should meet the following condition: all base stations in MBSFN synchronization area acquire synchronization wireless frame timing, so that wireless frames could be sent at one time; all base station perform same radio link control (RLC)/media access control (MAC)/physical (PHY) layer configuration to same MBMS or same MCCH control message; evolution multimedia broadcast multicast service (EMBMS) gate way (GW) broadcasts MBMS packet with SYNC protocol to each base station for sending service in grouping; all base stations send MCCH message by specified resource on air interface at specified transmission time, and send MBMS data under SYNC protocol.

In addition, it defines MBMS point-to-multipoint scheduling channel (MSCH) in LTE system, to ensure base stations send data of multiple MBMS in synchronization in a certain scheduled interval.

In process to achieve the present invention, the inventor find that there are at least the following problems in the existing technology:

By the design of the existing system, after base station has received synchronization data frames of all services, there is no mechanism to perform dynamic scheduling to different services, so the existing technology couldn't ensure the synchronization scheduling of service data in all base stations in MBSFN area, it is difficult to perform synchronization multiplexing transmission of multiple MBMS, accordingly, MSCH couldn't be scheduled in synchronization.

SUMMARY OF THE PRESENT INVENTION

The embodiments of the present invention provides a kind of synchronization schedule method, apparatus and system, so as to ensure a plurality of MBMS perform synchronization schedule and synchronization multiplexing between the base station equipments.

The embodiment of the present invention provides a kind of synchronization schedule method, comprising:

base station equipment obtaining a scheduling sequence of the multimedia broadcast multicast service (MBMS);

said base station equipment performing ordering to said received synchronization data frame of MBMS according to said scheduling sequence of MBMS, and sending said synchronization data frame of MBMS according to the ordering result.

The embodiment of the present invention provides a kind of base station equipment, comprising:

an obtaining module, is used for obtaining a scheduling sequence of the multimedia broadcast multicast service (MBMS);

a receiving module, is used for receiving synchronization data frame of MBMS from core network;

an ordering module, is used for performing ordering to the synchronization data frame of MBMS received by said receiving module, according to the scheduling sequence of MBMS obtained by said obtaining module;

a sending module, is used for sending the synchronization data frame of MBMS received by said receiving module, according to the ordering result of said ordering module.

The embodiment of the present invention provides a kind of MCE, comprising:

a receiving module, is used for receiving session beginning message of the multimedia broadcast multicast service (MBMS) from core network;

a constructing module, is used for constructing MBMS point-to-multipoint control channel (MCCH) message according to session beginning message of MBMS received by said receiving module;

a sending module, is used for sending said MCCH message constructed by said constructing module to said base station equipment, so that said base station equipment obtaining the scheduling sequence of MBMS according to said MCCH message.

The embodiment of the present invention provides a kind of synchronization schedule system, comprising:

multimedia broadcast multicast service coordination entity (MCE), is used for constructing multimedia broadcast multicast service point-to-multipoint control channel (MCCH) message according to session beginning message of multimedia broadcast multicast service (MBMS), and sending said MCCH message to base station equipment;

base station equipment, is used for receiving MCCH message from said MCE, determining the appearing sequence of MBMS radio bear identity in MBMS bearing information list included in said MCCH message as the scheduling sequence of MBMS, performing ordering to said received synchronization data frame of MBMS according to said scheduling sequence of MBMS, and sending said synchronization data frame of MBMS according to the ordering result.

The technical program of the embodiments of the present invention has the following advantage. The base station equipment obtains scheduling sequence of MBMS, before sending MBMS synchronization data frames, and makes the received synchronization data frame of MBMS perform ordering according to that scheduling sequence, so as to ensure a plurality of MBMS perform synchronization schedule and synchronization multiplex between the base station equipments, and make the system obtain the statistical multiplex gain of MBMS service.

DETAILED DESCRIPTION OF THE EMBODIMENTS OF THE PRESENT INVENTION

The technical program provided by the embodiments of the present invention is that, the base station equipment obtains scheduling sequence of MBMS, before sending MBMS synchronization data frames, and makes the received synchronization data frame of MBMS perform ordering according to that scheduling sequence, so as to ensure a plurality of MBMS perform synchronization schedule and synchronization multiplex between the base station equipments.

Embodiment of this invention will be clearly and completely described with pictures in the following. Apparently, the following embodiment is only a part of this invention, but not the whole invention. All the embodiments achieved by general technical personnel in this field based on this application without creative work belong to the protection scope of the present application.

Figure 1:
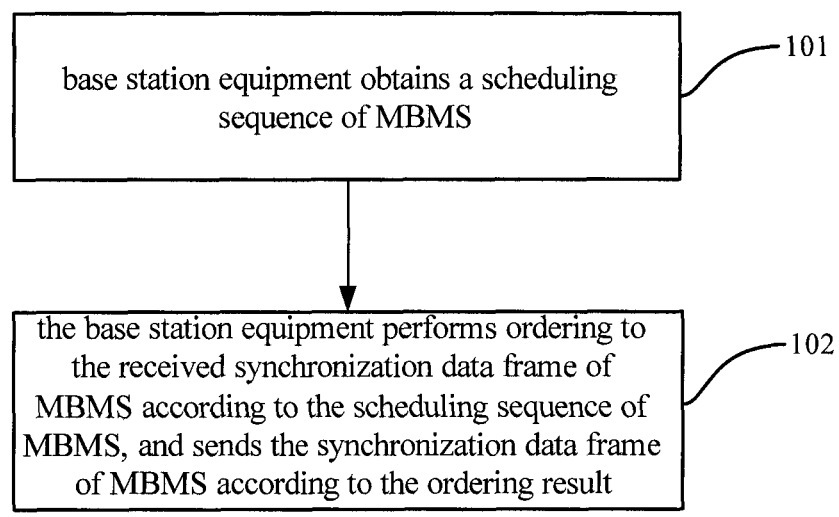
FIG. 1 is a flow diagram of the synchronization schedule method in embodiment 1 of the present invention.

FIG. 1 is a flow diagram of the synchronization schedule method in embodiment 1 of the present invention, comprising the following steps:

Step 101, base station equipment obtains a scheduling sequence of MBMS.

Specifically, the base station equipment could receive MCCH message from MBMS coordination entity (MCE), and determine the appearing sequence of MBMS radio bear identity in MBMS bearing information list included in that MCCH message as the scheduling sequence of MBMS; also could accept collocating by operation and maintenance O&M system, and determine the scheduling sequence of MBMS according to the result of collocation, the result of collocation comprises the scheduling sequence of temporary mobile group identity (TMGI) or MBMS identity; still could receive synchronization data frame of MBMS from core network, determine the scheduling sequence of MBMS according to group number in that synchronization data frame of MBMS.

Step 102, the base station equipment performs ordering to the received synchronization data frame of MBMS according to the scheduling sequence of MBMS, and sends the synchronization data frame of MBMS according to the ordering result.

The base station equipment needs to join multicast group according to IP multicast address in MCCH message, before receiving MBMS synchronization data frame. Because multiple MBMS synchronization data frames received by base station equipment arrive to the base station equipment without sequence, therefore, base station equipment could perform ordering to multiple received disordered synchronization data frames of MBMS, after determining scheduling sequence of MBMS, and performs scheduling transmission to MBMS synchronization data frames through MSCH according the ordering result.

The technical program of the embodiments of the present invention has the following advantage. The base station equipment obtains scheduling sequence of MBMS, before sending MBMS synchronization data frames, and makes the received synchronization data frame of MBMS perform ordering according to that scheduling sequence, so as to ensure a plurality of MBMS perform synchronization schedule and synchronization multiplex between the base station equipments, and make the system obtain the statistical multiplex gain of MBMS service.

The above-mentioned embodiment provides a synchronization schedule method, the following embodiment of the present invention will do detailed and specific description to the method combined with specific scenarios.

Figure 2:
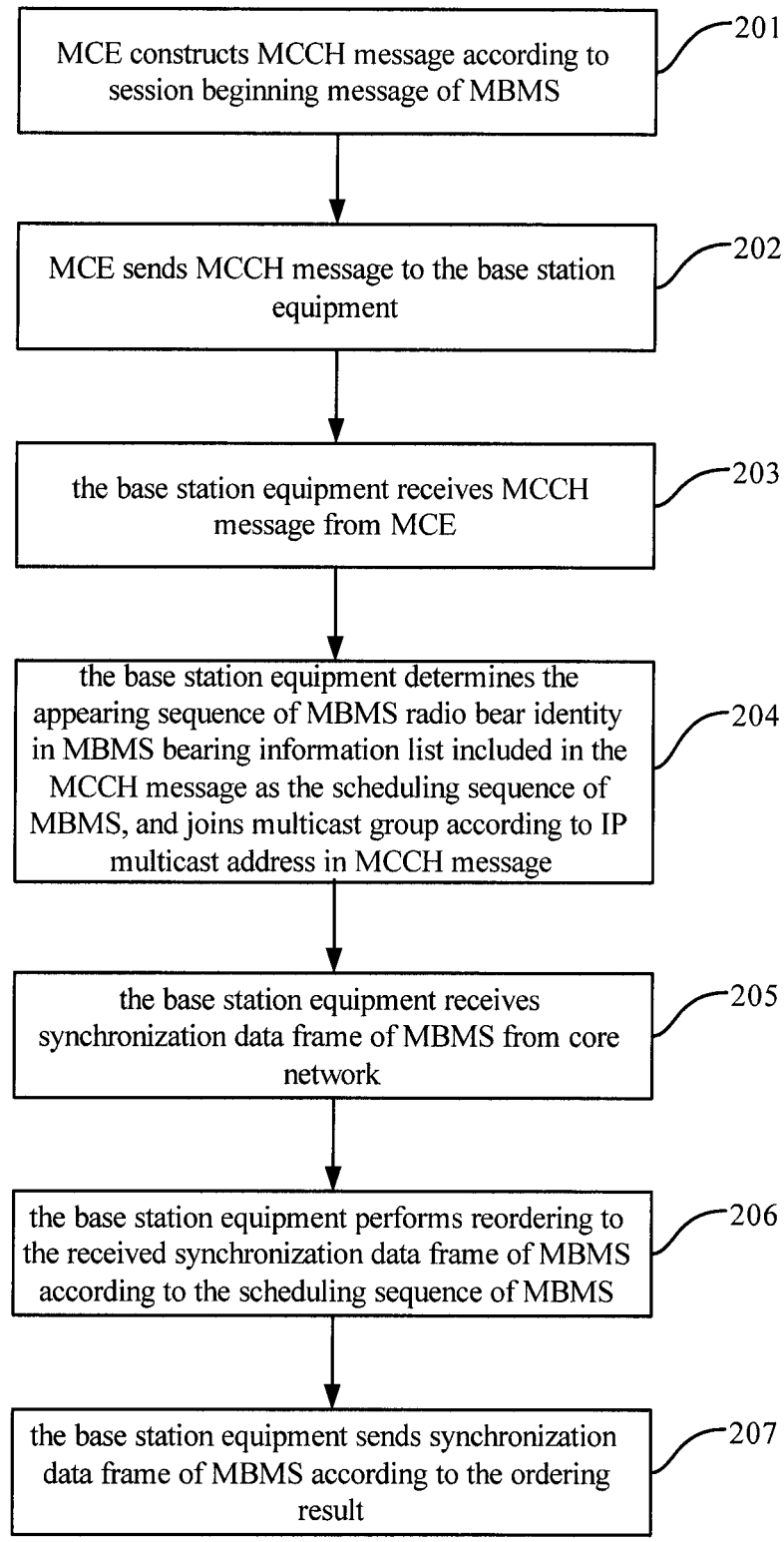
FIG. 2 is a flow diagram of the synchronization schedule method in embodiment 2 of the present invention.

FIG. 2 is a flow diagram of the synchronization schedule method in embodiment 2 of the present invention, comprising the following steps:

Step 201, MCE constructs MCCH message according to session beginning message of MBMS.

Specifically, in order to ensure MCCH synchronization between all base station equipment in whole MBSFN area, the content of the MCCH message need to be configured by MCE in unity. MCE could configure the MCCH message according to the arriving sequence of session beginning message of different MBMS from core network. For example, if the session beginning message corresponding to the service with TMGI=2 arrives earlier, then set the radio bear identity (RB id) of the service with TMGI=2 to 1, if the session beginning message corresponding to the service with TMGI=1 arrives later, then set the RB id of the service with TMGI=1 to 2 in order. Table 1 shows the organizational format table of MCCH message.

TABLE 1 organizational format table of MCCH message

| message type | message characterization |
|---|---|
| MCH Identity | MCH Identity |
| ... | |
| RB information list | radio bear information list |
| >MBMS Radio Bear Identity | MBMS radio bear identity |
| >RLC configuration | |
| >MBMS Service ID | MBMS service identity |
| >MBMS Session ID | MBMS session identity |
| >IP Multicast Address | IP multicast address |
| PMCH parameter | physical multicast channel parameter |
| ... | |

Step 202, MCE sends MCCH message to the base station equipment.

Specifically, MCE sends the constructed MCCH message to each base station equipment in MBSFN area through M2 interface.

Step 203, the base station equipment receives MCCH message from MCE.

Step 204, the base station equipment determines the appearing sequence of MBMS radio bear identity in MBMS bearing information list included in the MCCH message as the scheduling sequence of MBMS, and joins multicast group according to IP multicast address in MCCH message.

Therein, MBMS bearing information list in MCCH message comprises MBMS radio bear identity, MBMS service identity, MBMS session identity and IP multicast address, the base station equipment could determine the appearing sequence of MBMS radio bear identity as the sequence of scheduling different MBMS in scheduling period, also could join multicast group according to IP multicast address configured for different MBMS Date Plane.

Step 205, the base station equipment receives synchronization data frame of MBMS from core network.

Specifically, after joining multicast group corresponding to MBMS, the base station equipment starts to receive service data broadcast of MBMS from core network, obtains the synchronization data frame of MBMS, that synchronization data frame of MBMS comprises synchronization protocol header, that is unified sending time to different base station equipment.

Step 206, the base station equipment performs reordering to the received synchronization data frame of MBMS according to the scheduling sequence of MBMS.

Because synchronization data frames corresponding to multiple MBMS received by the base station equipment arrive to the base station equipment without sequence, therefore, to ensure service data of all base station equipment in MBSFN area could be sent in synchronization, the base station equipment could perform ordering to the synchronization data frames corresponding to different MBMS according to the scheduling sequence of MBMS determined in step 204, to arrange unified service sending sequence.

Step 207, the base station equipment sends synchronization data frame of MBMS according to the ordering result.

After determining the service sending sequence of different MBMS, the base station equipment performs scheduling sending to the synchronization data frame of MBMS through MSCH. If MBMS changes, MCE could send renewed sequence of MBMS RB id to the base station equipment through M2 interface; accordingly, the base station equipment determines new service sequence according to the renewed sequence of MBMS RB id, and performs ordering and scheduling sending to the synchronization data frame of MBMS in next scheduling cycle according to the new service sequence.

It needs to illustrate that the step order in the embodiment of the present invention could be adjusted according to requirement.

The technical program of the embodiments of the present invention has the following advantage. The base station equipment obtains scheduling sequence of MBMS according to received MCCH message, and makes the received synchronization data frame of MBMS perform ordering according to that scheduling sequence, so as to ensure a plurality of MBMS perform synchronization schedule and synchronization multiplex between the base station equipments, and make the system obtain the statistical multiplex gain of MBMS service.

In above-mentioned embodiment, base station equipment could obtain scheduling sequence of MBMS according to received MCCH message. The scheduling sequence of MBMS also could be configured by O&M system.

Figure 3:
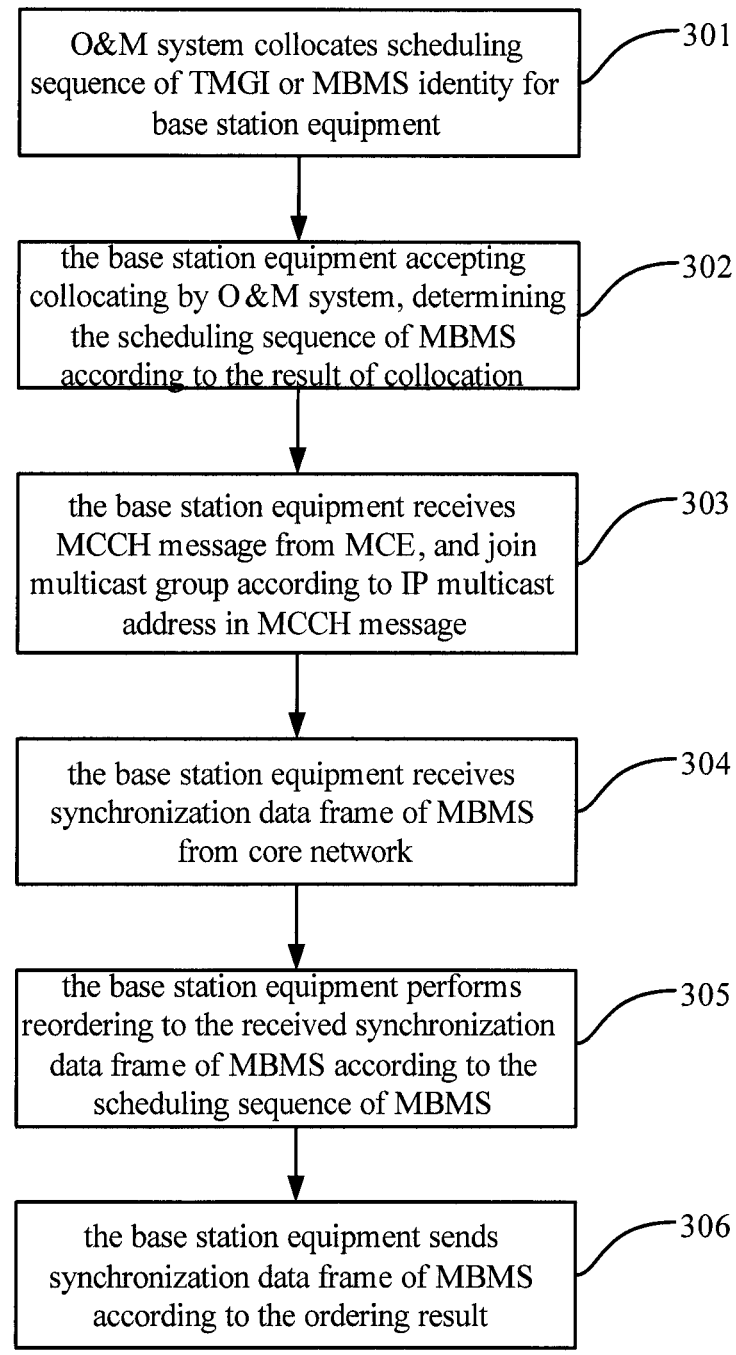
FIG. 3 is a flow diagram of the synchronization schedule method in embodiment 3 of the present invention.

FIG. 3 is a flow diagram of the synchronization schedule method in embodiment 3 of the present invention, comprising the following steps:

Step 301, O&M system collocates scheduling sequence of TMGI or MBMS identity for base station equipment.

Step 302, the base station equipment accepting collocating by O&M system, determining the scheduling sequence of MBMS according to the result of collocation.

Step 303, the base station equipment receives MCCH message from MCE, and join multicast group according to IP multicast address in MCCH message.

Therein, MBMS bearing information list in MCCH message could comprise MBMS radio bear identity, MBMS service identity, MBMS session identity and IP multicast address, base station equipment could only get IP multicast address in MBMS bearing information list, and join multicast group according to IP multicast address configured for different MBMS.

Step 304, the base station equipment receives synchronization data frame of MBMS from core network.

Specifically, after joining multicast group corresponding to MBMS, the base station equipment starts to receive service data broadcast of MBMS from core network, obtains the synchronization data frame of MBMS, that synchronization data frame of MBMS comprises synchronization protocol header, that is unified sending time to different base station equipment.

Step 305, the base station equipment performs reordering to the received synchronization data frame of MBMS according to the scheduling sequence of MBMS.

Because synchronization data frames corresponding to multiple MBMS received by the base station equipment arrive to the base station equipment without sequence, therefore, to ensure service data of all base station equipment in MBSFN area could be sent in synchronization, the base station equipment could perform ordering to the synchronization data frames corresponding to different MBMS according to the scheduling sequence of MBMS determined in step 204, to arrange unified service sending sequence.

Step 306, the base station equipment sends synchronization data frame of MBMS according to the ordering result.

After determining the service sending sequence of different MBMS, the base station equipment performs scheduling sending to the synchronization data frame of MBMS through MSCH. If MBMS changes, O&M system could re-collocate scheduling sequence of TMGI or MBMS identity for the base station equipment; accordingly, the base station equipment determines new service sequence according to the result of re-collocation, and performs ordering and scheduling sending to the synchronization data frame of MBMS in next scheduling cycle according to the new service sequence.

It needs to illustrate that the step order in the embodiment of the present invention could be adjusted according to requirement.

The technical program of the embodiments of the present invention has the following advantage. The base station equipment obtains scheduling sequence of MBMS according to the result of collocation by O&M system, and makes the received synchronization data frame of MBMS perform ordering according to that scheduling sequence, so as to ensure a plurality of MBMS perform synchronization schedule and synchronization multiplex between the base station equipments, and make the system obtain the statistical multiplex gain of MBMS service.

In above-mentioned embodiment, the O&M system collocates the scheduling sequence of MBMS. The scheduling sequence of MBMS could be predetermined in core network.

Figure 4:
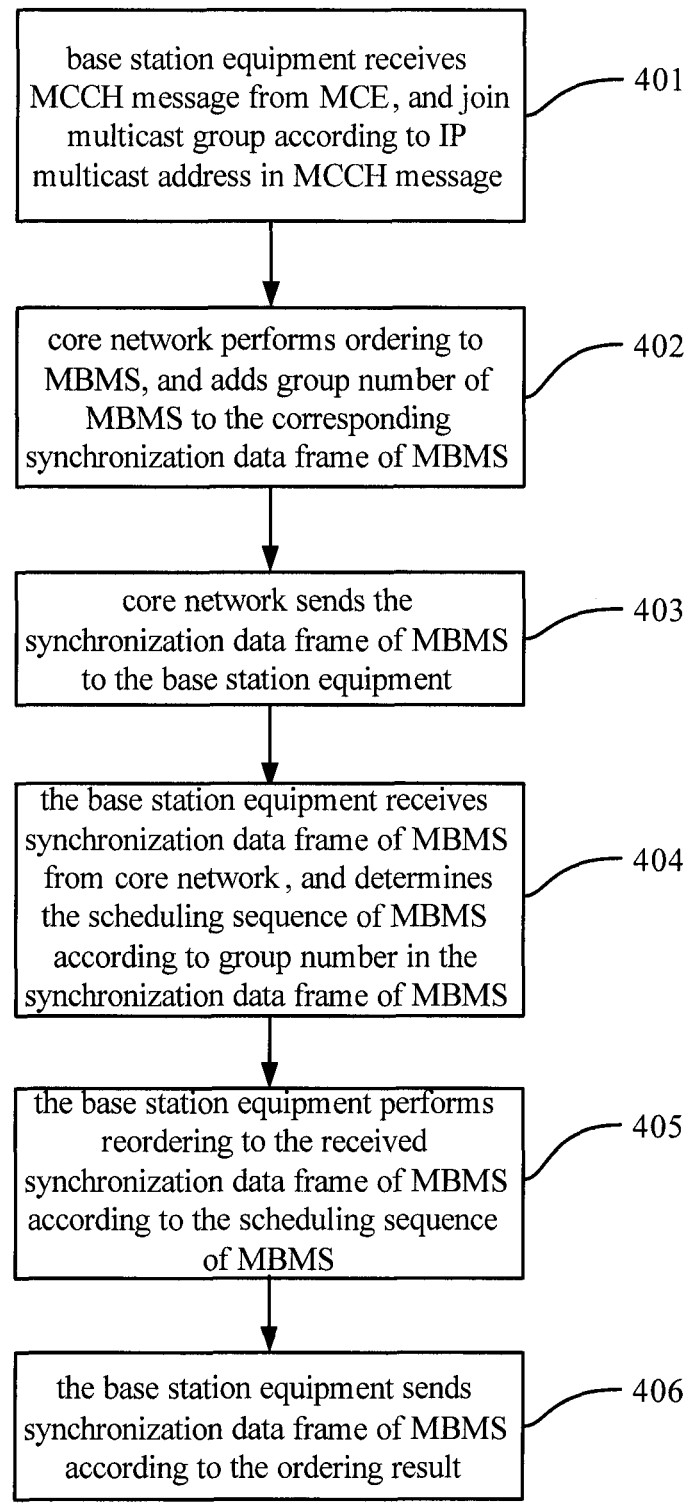
FIG. 4 is a flow diagram of the synchronization schedule method in embodiment 4 of the present invention.

FIG. 4 is a flow diagram of the synchronization schedule method in embodiment 4 of the present invention, comprising the following steps:

Step 401, base station equipment receives MCCH message from MCE, and join multicast group according to IP multicast address in MCCH message.

Therein, MBMS bearing information list in MCCH message could comprise MBMS radio bear identity, MBMS service identity, MBMS session identity and IP multicast address, base station equipment could only get IP multicast address in MBMS bearing information list, and join multicast group according to IP multicast address configured for different MBMS.

Step 402, core network performs ordering to MBMS, and adds group number of MBMS to the corresponding synchronization data frame of MBMS.

Figure 5:
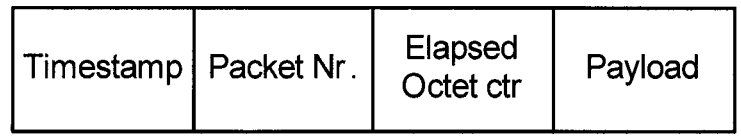
FIG. 5 is a format diagram of synchronization data frame of MBMS in embodiment 4 of the present invention.

Specifically, core network performs ordering to MBMS in advance, and adds group number of ordered MBMS to the corresponding synchronization data frame of MBMS. FIG. 5 is a format diagram of synchronization data frame of MBMS in embodiment 4 of the present invention.

Therein, Timestamp is absolute time stamp for air interface sending of MBMS, Packet Nr is group number of ordered MBMS, Elapsed Octet ctr is count of bytes of data has been sent.

Step 403, core network sends the synchronization data frame of MBMS to the base station equipment.

Step 404, the base station equipment receives synchronization data frame of MBMS from core network, and determines the scheduling sequence of MBMS according to group number in the synchronization data frame of MBMS.

Specifically, after joining multicast group corresponding to MBMS, the base station equipment starts to receive service data broadcast of MBMS from core network, obtains the synchronization data frame of MBMS, that synchronization data frame of MBMS comprises synchronization protocol header, that is unified sending time to different base station equipment.

Step 405, the base station equipment performs reordering to the received synchronization data frame of MBMS according to the scheduling sequence of MBMS.

Because synchronization data frames corresponding to multiple MBMS received by the base station equipment arrive to the base station equipment without sequence, therefore, to ensure service data of all base station equipment in MBSFN area could be sent in synchronization, the base station equipment could perform ordering to the synchronization data frames corresponding to different MBMS according to the scheduling sequence of MBMS determined in step 204, to arrange unified service sending sequence.

Step 406, the base station equipment sends synchronization data frame of MBMS according to the ordering result.

After determining the service sending sequence of different MBMS, the base station equipment performs scheduling sending to the synchronization data frame of MBMS through MSCH.

It needs to illustrate that the step order in the embodiment of the present invention could be adjusted according to requirement.

The technical program of the embodiments of the present invention has the following advantage. The base station equipment obtains scheduling sequence of MBMS according to the group number in the synchronization data frame of MBMS, and makes the received synchronization data frame of MBMS perform ordering according to that scheduling sequence, so as to ensure a plurality of MBMS perform synchronization schedule and synchronization multiplex between the base station equipments, and make the system obtain the statistical multiplex gain of MBMS service.

The above-mentioned embodiments of the present invention provide a synchronization schedule method and specific scenarios, the following embodiment of the present invention will provide the apparatus and system using the above-mentioned method.

Figure 6:
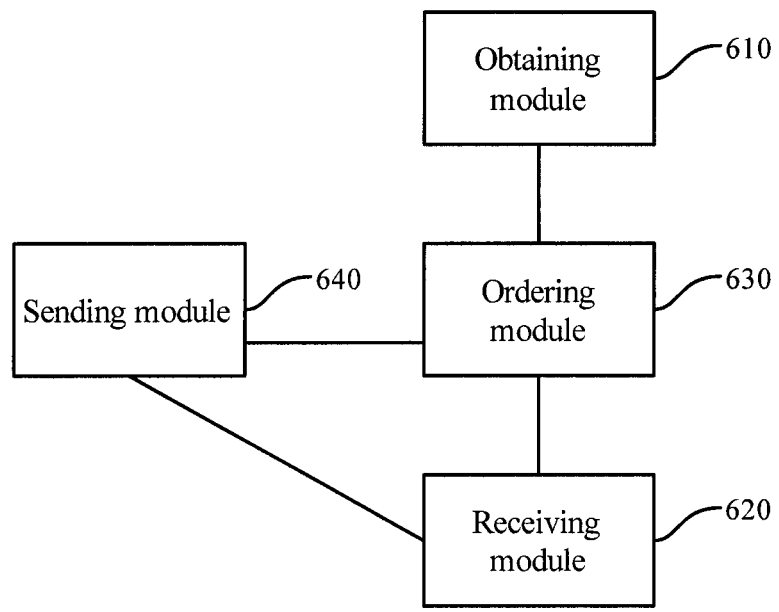
FIG. 6 is a structure diagram of the base station equipment in embodiment 5 of the present invention.

FIG. 6 is a structure diagram of the base station equipment in embodiment 5 of the present invention, the base station equipment comprises:

Obtaining module 610, is used for obtaining a scheduling sequence of MBMS.

The obtaining module 610 is a part of the above-mentioned base station equipment, which is in charge of obtaining scheduling sequence of MBMS, it could be software, hardware or the combination of both.

Receiving module 620, is used for receiving synchronization data frame of MBMS from core network.

Specifically, the obtaining module 610 could determine the appearing sequence of MBMS RB id in MCCH message received by the receiving module 620 as the scheduling sequence of MBMS; also could accept collocating by O&M system, and determine the scheduling sequence of MBMS according to the result of collocation, the result of the collocation comprises the scheduling sequence of TMGI or MBMS identity; still could receive synchronization data frame of MBMS from core network, and determine the scheduling sequence of MBMS according to group number in the synchronization data frame of MBMS.

The receiving module 620 is a part of the above-mentioned base station equipment, which is in charge of receiving the synchronization data frame of MBMS from core network, it could be software, hardware or the combination of both.

Ordering module 630, is used for performing ordering to the synchronization data frame of MBMS received by the receiving module 620, according to the scheduling sequence of MBMS obtained by the obtaining module 610.

The ordering module 630 is a part of the above-mentioned base station equipment, which is in charge of performing ordering to the synchronization data frame of MBMS, it could be software, hardware or the combination of both.

Sending module 640, is used for sending the synchronization data frame of MBMS received by the receiving module 620, according to the ordering result of the ordering module 630.

Specifically, the receiving module 620 needs to join multicast group according to IP multicast address in MCCH message, before receiving MBMS synchronization data frame. Because multiple MBMS synchronization data frames received by the receiving module 620 arrive to the base station equipment without sequence, therefore, the ordering module 630 could perform ordering to multiple received disordered synchronization data frames of MBMS, according to the scheduling sequence of MBMS determined by the obtaining module 610, the sending module 640 performs scheduling transmission to MBMS synchronization data frames through MSCH according the ordering result.

The sending module 640 is a part of the above-mentioned base station equipment, which is in charge of sending the synchronization data frame of MBMS, it could be software, hardware or the combination of both.

The above-mentioned obtaining module 610, is specifically used for receiving MCCH message from MCE, and determining the appearing sequence of MBMS radio bear identity in MBMS bearing information list included in the MCCH message as the scheduling sequence of MBMS.

Therein, MBMS bearing information list in MCCH message comprises MBMS radio bear identity, MBMS service identity, MBMS session identity and IP multicast address, the obtaining module 610 could determine the appearing sequence of MBMS radio bear identity as the sequence of scheduling different MBMS in scheduling period, also could join multicast group according to IP multicast address configured for different MBMS.

The above-mentioned obtaining module 610, also could specifically use for accepting collocating by O&M system, and determine the scheduling sequence of MBMS according to the result of collocation, the result of the collocation comprises the scheduling sequence of TMGI or MBMS identity.

The above-mentioned obtaining module 610, also could specifically use for determining the scheduling sequence of MBMS according to group number in the synchronization data frame of MBMS received by the receiving module 620.

The technical program of the embodiments of the present invention has the following advantage. The base station equipment obtains scheduling sequence of MBMS, before sending MBMS synchronization data frames, and makes the received synchronization data frame of MBMS perform ordering according to that scheduling sequence, so as to ensure a plurality of MBMS perform synchronization schedule and synchronization multiplex between the base station equipments, and make the system obtain the statistical multiplex gain of MBMS service.

Figure 7:
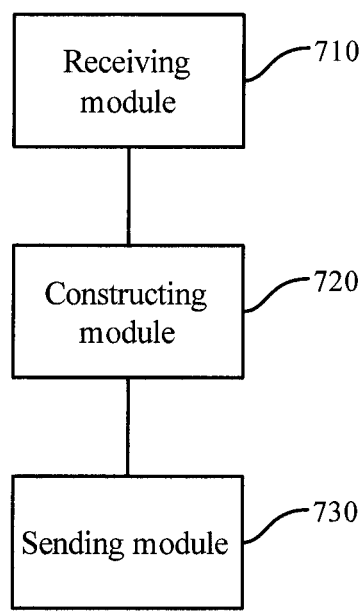
FIG. 7 is a structure diagram of the MCE in embodiment 6 of the present invention.

FIG. 7 is a structure diagram of the MCE in embodiment 6 of the present invention, the MCE comprises:

Receiving module 710, is used for receiving session beginning message of MBMS from core network.

The receiving module 710 is a part of the above-mentioned MCE, which is in charge of receiving session beginning message of MBMS from core network, it could be software, hardware or the combination of both.

Constructing module 720, is used for constructing MCCH message according to session beginning message of MBMS received by the receiving module 710.

In order to ensure MCCH synchronization between all base station equipment in whole MBSFN area, the constructing module 720 configures the content of the MCCH message in unity. Specifically, the constructing module 720 could configure the MCCH message according to the arriving sequence of session beginning message of different MBMS from core network. For example, if the session beginning message corresponding to the service with TMGI=2 arrives earlier, then set the radio bear identity (RB id) of the service with TMGI=2 to 1, if the session beginning message corresponding to the service with TMGI=1 arrives later, then set the RB id of the service with TMGI=1 to 2 in order.

The constructing module 720 is a part of the above-mentioned MCE, which is in charge of constructing MCCH message, it could be software, hardware or the combination of both.

Sending module 730, is used for sending said MCCH message constructed by the constructing module 720 to the base station equipment, so that the base station equipment obtaining the scheduling sequence of MBMS according to the MCCH message.

Specifically, the sending module 730 sends the MCCH message to each base station equipment in MBSFN area through M2 interface.

The above-mentioned MCCH message comprises MBMS bearing information list, that MBMS bearing information list comprises MBMS RB id, the appearing sequence of that MBMS RB id is used as the scheduling sequence of MBMS.

The sending module 730 is a part of the above-mentioned MCE, which is in charge of sending the MCCH message to the base station equipment, it could be software, hardware or the combination of both.

The base station equipment receives MCCH message from MCE, and determines the appearing sequence of MBMS radio bear identity in MBMS bearing information list included in the MCCH message as the scheduling sequence of MBMS, and joins multicast group according to IP multicast address in MCCH message.

Therein, MBMS bearing information list in MCCH message comprises MBMS radio bear identity, MBMS service identity, MBMS session identity and IP multicast address, base station equipment could determine the appearing sequence of MBMS radio bear identity as the sequence of scheduling different MBMS in scheduling period, also could join multicast group according to IP multicast address configured for different MBMS.

After joining multicast group corresponding to MBMS, the base station equipment starts to receive service data broadcast of MBMS from core network, obtains the synchronization data frame of MBMS, that synchronization data frame of MBMS comprises synchronization protocol header, that is unified sending time to different base station equipment.

Because synchronization data frames corresponding to multiple MBMS received by the base station equipment arrive to the base station equipment without sequence, therefore, to ensure service data of all base station equipment in MBSFN area could be sent in synchronization, the base station equipment could perform ordering to the synchronization data frames corresponding to different MBMS according to the determined scheduling sequence of MBMS, to arrange unified service sending sequence.

After determining the service sending sequence of different MBMS, the base station equipment performs scheduling sending to the synchronization data frame of MBMS through MSCH. If MBMS changes, the sending module 730 could send renewed sequence of MBMS RB id to the base station equipment through M2 interface; accordingly, the base station equipment determines new service sequence according to the renewed sequence of MBMS RB id, and performs ordering and scheduling sending to the synchronization data frame of MBMS in next scheduling cycle according to the new service sequence.

The technical program of the embodiments of the present invention has the following advantage. The base station equipment obtains scheduling sequence of MBMS according to received MCCH message, and makes the received synchronization data frame of MBMS perform ordering according to that scheduling sequence, so as to ensure a plurality of MBMS perform synchronization schedule and synchronization multiplex between the base station equipments, and make the system obtain the statistical multiplex gain of MBMS service.

Figure 8:
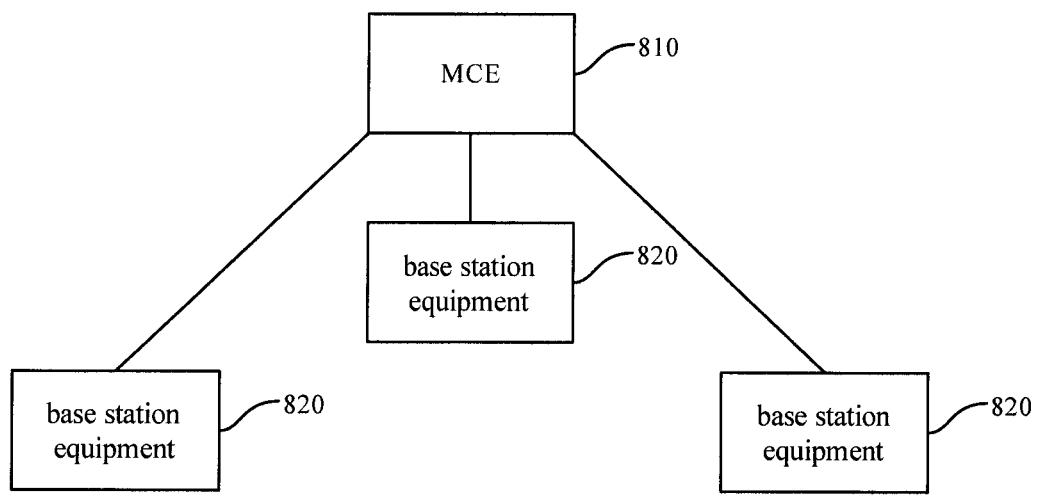
FIG. 8 is a structure diagram of the synchronization schedule system in embodiment 7 of the present invention.

FIG. 8 is a structure diagram of the synchronization schedule system in embodiment 7 of the present invention, the system comprising:

MCE 810, is used for constructing MCCH message according to session beginning message of MBMS, and sending the MCCH message to base station equipment 820.

Specifically, in order to ensure MCCH synchronization between all base station equipment in whole MBSFN area, the content of the MCCH message need to be configured by MCE 810 in unify. MCE 810 could configure the MCCH message according to the arriving sequence of session beginning message of different MBMS from core network. For example, if the session beginning message corresponding to the service with TMGI=2 arrives earlier, then set the RB id of the service with TMGI=2 to 1, if the session beginning message corresponding to the service with TMGI=1 arrives later, then set the RB id of the service with TMGI=1 to 2 in order.

MCE 810 sends the constructed MCCH message to each base station equipment in MBSFN area through M2 interface.

The base station equipment 820, is used for receiving MCCH message from the MCE 810, determining the appearing sequence of MBMS radio bear identity in MBMS bearing information list included in the MCCH message as the scheduling sequence of MBMS, performing ordering to received synchronization data frame of MBMS according to the scheduling sequence of MBMS, and sending the synchronization data frame of MBMS according to the ordering result.

Therein, MBMS bearing information list in MCCH message comprises MBMS radio bear identity, MBMS service identity, MBMS session identity and IP multicast address, the base station equipment 820 could determine the appearing sequence of MBMS radio bear identity as the sequence of scheduling different MBMS in scheduling period, also could join multicast group according to IP multicast address configured for different MBMS.

After joining multicast group corresponding to MBMS, the base station equipment 820 starts to receive service data broadcast of MBMS from core network, obtains the synchronization data frame of MBMS, that synchronization data frame of MBMS comprises synchronization protocol header, that is unified sending time to different base station equipment.

Because synchronization data frames corresponding to multiple MBMS received by the base station equipment 820 arrive to the base station equipment without sequence, therefore, to ensure service data of all base station equipment in MBSFN area could be sent in synchronization, the base station equipment 820 could perform ordering to the synchronization data frames corresponding to different MBMS according to the determined scheduling sequence of MBMS, to arrange unified service sending sequence.

After determining the service sending sequence of different MBMS, the base station equipment 820 performs scheduling sending to the synchronization data frame of MBMS through MSCH. If MBMS changes, MCE 810 could send renewed sequence of MBMS RB id to the base station equipment 820 through M2 interface; accordingly, the base station equipment 820 determines new service sequence according to the renewed sequence of MBMS RB id, and performs ordering and scheduling sending to the synchronization data frame of MBMS in next scheduling cycle according to the new service sequence.

The technical program of the embodiments of the present invention has the following advantage. The base station equipment 820 obtains scheduling sequence of MBMS according to received MCCH message, and makes the received synchronization data frame of MBMS perform ordering according to that scheduling sequence, so as to ensure a plurality of MBMS perform synchronization schedule and synchronization multiplex between the base station equipments, and make the system obtain the statistical multiplex gain of MBMS service.

Through the description of the embodiments above, the technical personnel in this field can understand clearly that the present invention can be implemented by software and necessary current hardware platform. Of course, it also can be implemented by hardware, but in many situations the former is the better. Based on this understanding, essence or section with contribution to existing technology of the technical program of the present invention can be embodied by a form of software product which can be stored in a storage medium, including a number of instructions for making a computer device (such as mobile phone, personal computers, servers, or network equipments, etc.) implement the methods described in the embodiments of the present invention.

The descriptions above are just preferred implement ways of the present invention. It should be pointed that, for general technical personnel in this field, some improvement and decorating can be done, which should be as the protection scope of the present invention.

The technical personnel in this field can understand the modules of the devices in the embodiments can be set in the devices according to the description of the embodiments, also can be set in one or more devices different from the embodiments. Modules in the above-mentioned embodiments can be integrated in one entirety, also can be deployed separately, can be combined into one module, also can be further split into multiple sub-modules.

Serial numbers of the above-mentioned embodiments of the present invention are only used for description, it does not express whether the embodiment is excellent or poor.

The public content is only some specific embodiments of the present invention. However, the invention is not limited by these, whatever modifications can be imagined by the technical personnel in this field all should be in the protective range of the present invention.

The invention claimed is:

1. A synchronization schedule method, comprising:
   obtaining, by a base station equipment, a scheduling sequence of a plurality of different multimedia broadcast multicast services (MBMS);
   performing, by the base station equipment, ordering to received synchronization data frame of the plurality of different MBMS according to said scheduling sequence of the plurality of different MBMS, and sending, by the base station equipment, said synchronization data frame of the plurality of different MBMS according to an ordering result;
   wherein, obtaining, by the base station equipment, the scheduling sequence of the plurality of different MBMS, comprising:
   receiving, by the base station equipment, MBMS point-to-multipoint control channel (MCCH) message from MBMS coordination entity (MCE);
   determining, by the base station equipment, an appearing sequence of MBMS radio bearer identity in MBMS bearing information list included in said MCCH message as the scheduling sequence of the plurality of different MBMS;
   wherein before said base station equipment receives the MCCH message from the MCE, the method further comprises:
   constructing, by the MCE, said MCCH message according to an arriving sequence of session beginning messages of the plurality of different MBMS;
   sending, by the MCE, said MCCH message to said base station equipment.

2. The method according to claim 1, wherein, obtaining, by the base station equipment, the scheduling sequence of the plurality of different MBMS, comprising:
   accepting, by the base station equipment, configuring by an operation and maintenance (O&M) system, and determining, by the base station equipment, the scheduling sequence of the plurality of different MBMS according to a result of the configuring, the result of the configuring comprising a scheduling sequence of temporary mobile group identity (TMGI) or MBMS identity.

3. The method according to claim 1, wherein, obtaining, by the base station equipment, the scheduling sequence of the plurality of different MBMS, comprising:
   receiving, by the base station equipment, synchronization data frame of the plurality of different MBMS from core network, determining, by the base station equipment, the scheduling sequence of the plurality of different MBMS according to group number in said synchronization data frame of the plurality of different MBMS.

4. The method according to claim 3, wherein, before said base station equipment receives the synchronization data frame of the plurality of different MBMS from the core network, further comprising:
   performing, by the core network, ordering to the plurality of different MBMS, and adding, by the core network, the group number of the plurality of different MBMS into the corresponding synchronization data frame of the plurality of different MBMS;
   sending, by the core network, said synchronization data frame of the plurality of different MBMS to said base station equipment.

5. A base station equipment, comprising:
   an obtaining module, for obtaining a scheduling sequence of a plurality of different multimedia broadcast multicast services (MBMS);
   a receiving module, for receiving synchronization data frame of the plurality of different MBMS from core network;
   an ordering module, for performing ordering to the synchronization data frame of the plurality of different MBMS received by said receiving module, according to the scheduling sequence of the plurality of different MBMS obtained by said obtaining module;
   a sending module, for sending the synchronization data frame of the plurality of different MBMS received by said receiving module, according to an ordering result of said ordering module;
   said obtaining module, is specifically used for receiving MBMS point-to-multipoint control channel (MCCH) message from MBMS coordination entity (MCE), and determining an appearing sequence of MBMS radio bearer identity in MBMS bearing information list included in said MCCH message as the scheduling sequence of the plurality of different MBMS;
   wherein the MCCH message is constructed by the MCE according to an arriving sequence of session beginning messages of the plurality of different MBMS.

6. The base station equipment according to claim 5, wherein,
   said obtaining module, is specifically used for accepting configuring by an operation and maintenance (O&M) system, and determining the scheduling sequence of the plurality of different MBMS according to a result of the configuring, the result of the configuring comprising a scheduling sequence of temporary Mobile group identity (TMGI) or MBMS identity.

7. The base station equipment according to claim 5, wherein,
   said obtaining module, is specifically used for determining the scheduling sequence of the plurality of different MBMS according to group number in said synchronization data frame of the plurality of different MBMS received by said receiving module.

8. A multimedia broadcast multicast service coordination entity (MCE), comprising:
  a receiving module, for receiving session beginning messages of a plurality of different multimedia broadcast multicast services (MBMS) from core network;
  a constructing module, for constructing an MBMS point-to-multipoint control channel (MCCH) message according to an arriving sequence of the session beginning messages of the plurality of different MBMS received by said receiving module;
  a sending module, for sending said MCCH message constructed by said constructing module to said base station equipment, so that said base station equipment obtains the scheduling sequence of the plurality of different MBMS according to said MCCH message;
  said MCCH message comprises MBMS bearing information list, said MBMS bearing information list comprises MBMS radiobearer identity, an appearing sequence of said MBMS bearing identity is determined as the scheduling sequence of the plurality of different MBMS.

9. A synchronization schedule system, comprising:
  a multimedia broadcast multicast service coordination entity (MCE), for constructing a multimedia broadcast multicast service point-to-multipoint control channel (MCCH) message according to an arriving sequence of session beginning messages of a plurality of different multimedia broadcast multicast services (MBMS), and sending said MCCH message to a base station equipment;
  the base station equipment, for receiving the MCCH message from said MCE, determining an appearing sequence of MBMS radio bearer identity in an MBMS bearing information list included in said MCCH message as a scheduling sequence of the plurality of different MBMS, performing ordering to received synchronization data frame of the plurality of different MBMS according to said scheduling sequence of the plurality of different MBMS, and sending said synchronization data frame of the plurality of different MBMS according to an ordering result.

* * * * *